3,397,087
METHOD OF COATING A SHAPED CARBON ARTICLE WITH A POLYCARBON FLUORIDE

Shiro Yoshizawa, Sakyo-ku, Kyoto, and Nobuatsu Watanabe, Ukyo-ku, Kyoto, Japan, assignors to Nippon Carbon Co., Ltd., Tokyo, Japan
No Drawing. Filed Feb. 3, 1964, Ser. No. 342,282
Claims priority, application Japan, June 27, 1963, 38/32,976, 38/32,977
1 Claim. (Cl. 117—228)

ABSTRACT OF THE DISCLOSURE

A shaped carbon article is provided with a surface coating of a polycarbon fluoride containing carbon and fluorine atoms in an essentially 1:1 ratio with the atoms bonded by covalent chemical bonds, by reacting said carbon article with fluorine or a fluorine liberating compound in a nickel plated container at a temperature of about 100°–550° C. for about 30 minutes to about 4 hours. The resulting product has excellent chemical resistance, water repellent, oil-repellent, heat resistance, and lubricating properties.

---

The present invention relates to a method of manufacturing inorganic poly-carbon fluoride having chemical resistance, water repellent, oil repellent and lubricating properties consisting of covalent bond between carbon atoms and fluorine atoms by the reaction of carbon, preferably graphite, and fluorine and also to carbon or graphite articles with the above properties by fluorinating its surface and also to the fluorination process.

Carbon and graphite are very difficult to melt or evaporate and have very good electrical and thermal conductivities as well as good lubricating property and moreover, they do not dissolve in most solvents and are chemically stable without being attacked by most chemicals, on the other hand have strong ability of adsorbing other materials. By utilizing such properties, various kinds of products have been manufactured, yet they are liable to be attacked by strong acids and wettable by water and oil and adsorb the other materials so that their use is limited and causes disadvantages.

On the other hand, inorganic poly-carbon fluoride $(CF)_n$ obtained by reacting fluorine with carbon is not substantially attacked by almost all chemicals and not wetted with water or oil and have strong hydrophobic, oil repellent, lubricating, and electric insulating properties. These properties very well resemble those of resins containing fluorine such as polytetrafluorethylene (Teflon) and moreover, they do not burn like resins containing fluorine such as polytetrafluorethylene and are very stable up to 550° C. under the atmospheric pressure.

Such compounds ranging from colorless to grey color can be easily manufactured in various stages of fluorination according to the change of treating condition corresponding to the kinds of carbonaceous raw materials, temperature and time and the like manufacturing conditions and its yield is substantially 100% and high purity products can easily be obtained irrespective of the purity of carbonaceous raw materials so that it needs no special refining process, but by only one stage fluorination process of high yield a very pure product can easily be obtained from impure raw materials so that by comparing it with resins containing fluorine such as polytetrafluorethylene (Teflon) having very similar properties which are manufactured by very complicated manufacturing steps it will be apparent that the cost of its manufacture is incomparably low.

The inorganic poly-fluorine compounds manufactured by the method of the invention have different structure from resins containing fluorine such as polytetrafluorethylene (Teflon). The compounds of the invention can be represented by the chemical formula $(CF)_n$, wherein the mole ratio of carbon and fluorine is 1:1 and $n$ is not definite according to the kinds of carbon material used and its molecular weight is assumed to be about several ten thousands. When the carbon is in the form of graphite, the compounds have a chemical covalent bond between fluorine introduced in the layer constituting the laminar lattice structure of graphite and one free electron of the four valence electrons of a carbon atom. Graphite has a highly crystalline structure and in its crystal lattice, the crystals are regularly arranged. The fluorine atoms enter into the inside of the crystal layers. However, if the carbon is amorphous the crystal layers thereof are irregular. This means the fluorine atoms cannot enter as deeply into the inside of the amorphous carbon. In such cases, however, the chemical resistance, hydrophobic, oil repellent properties of the products are not substantially different from those of the product using natural lamp graphite.

Moreover, even in case of the natural graphite, by the regulation of reacting conditions, such as concentration of fluorine, temperature and time of treatment in case of fluorination, it is possible that the fluorinated product can be manufactured on the superficial layer only. In this case, the crystal proper has properties of carbon or graphite, and the superficial layer only furnishes the above described properties to the product.

Further, according to the method of the invention the surfaces of carbon or graphite particles or shaped articles made from carbon as well as the surfaces of pores occluded therein can be covered with the layer of inorganic poly-carbon fluoride, thereby giving them hydrophobic, oil repellent and other properties.

For instance, if the carbon or graphite articles or parts as described below are subjected to the above fluorination treatment, the surfaces of these articles and surfaces of pores occluded therein can be fluorinated to have hydrophobic, oil repellent and chemical resistance properties so that the following five disadvantages of such articles can be obviated.

(1) The disadvantage of accelerating corrosion of metals coming in contact with the graphite lubricant to be used at high temperatures, refractory carbon or graphite packings, sealing rings and bearings by the existence of moisture, salts, chemicals, air, etc.

(2) The disadvantage of deteriorating the function of porous carbon electrodes used for accelerating the ionization of such gas as oxygen in the electrode to be used for fuel cells or air cells when electrolyte enters into pores of the electrode to wet the inner surfaces thereof.

(3) The disadvantage of shortening the life of the carbon or graphite electrode to be used for an anode of electrolytic cell for generating halogen when electrolyte enters into pores of the electrode.

(4) The disadvantage of accelerating wear in carbon sliders by means of moisture and salts.

(5) The disadvantage of lowering the property of electric motor brushes by the existence of moisture and salts.

A method of manufacturing inorganic polycarbon fluoride by the invention is as follows:

The carbon or graphite raw material is charged into a nickel or nickel plated reactor in an electric furnace which is maintained at a predetermined temperature by means of an automatic temperature regulator. Fluorine gas was introduced for a specified reaction period to produce the inorganic poly-carbon fluoride in the form of a white to greyish black colored powder depending on the crystallinity, that is, graphitization degree of carbonaceous materials. Instead of fluorine, halogen fluorides, e.g., $ClF_3$ or a mixture of fluorine and halogen fluorides may be used to obtain inorganic poly-carbon fluoride by the similar reaction and also the same results can be obtained by heating them together with higher metal fluoride compounds ($CoF_3$, etc.).

In order to avoid unnecessary violent reaction when fluorine gas and the like gases are introduced, it is more convenient to dilute said gases by admixture with nitrogen, argon, helium, carbon dioxide and the like inert gas.

Fluorine may be produced by the electrolysis of KF·2HF bath, and hydrogen fluoride existing as an impurity does not necessarily have to be purified since it does not disturb the reaction of fluorine and carbon or graphite but rather it assists the reaction and also reacts with silica contained in carbon or graphite material to eliminate it as fluosilicic acid. By using fluorine containing such hydrogen fluoride the content of silica which is the main impurity in carbon or graphite raw material need not be taken into consideration, and without using separate purifying process, a product of high purity can be obtained.

Advanced crystallized and highly graphitized graphite as well as non-advanced crystallized and low graphitized carbon can advance fluorination at all portions where they make contact with fluorine by the above operation so that the product thus obtained gives substantially the same properties in chemical resistance, hydrophobic and oil repellent properties.

The operating conditions such as the grain size of carbon or graphite raw material, concentration of fluorine, reaction temperature and time have co-relation so that they should be regulated always according to the required object.

A method of surface treatment of shaped articles consisting of carbon or graphite according to the invention will not be described.

Shaped articles consisting of carbon or graphite are put in a nickel plated container in an electric furnace and its temperature is maintained at a desired degree by means of an automatic temperature regulator, and then fluorine gas is passed into the container. By regulating the concentration of fluorine gas, temperature and time of reaction, inorganic poly-carbon fluoride is coated on the surface of the article and also the surface of pores occluded therein, thereby giving properties of hydrophobic, oil repellent and chemical resistance to the shaped articles.

In this case, it is sometimes more convenient to use, instead of fluorine as above described, a halogen fluoride or a higher metal fluorine compound or such gases diluted with nitrogen, argon, helium and the like inert gas.

The invention will be further explained in detail by the following examples.

Example 1

1 g. of natural graphite powder of 100 to 200 meshes was put in a nickel plated reactor and the temperature was maintained at about 420° C. in an electric furnace provided with an automatic temperature regulator and a mixture of 6 parts (by volume) of fluorine gas and 4 parts (by volume) of nitrogen gas was introduced at a rate of 300 cc./min. and reacted for 2 hours to obtain 2.5 g. of graphite fluoride which was a white and somewhat transparent powder.

When the powder was heated at 400° C. for 5 hours no change occurred. Further, it was heated in 20% hydrochloric acid or 50% caustic soda solution for 4 hours, but no change occurred and by stirring in boiling water or oil the powder was not wetted at all.

The laminar lattice of carbon structure is put under some degree of strain by the fluorine bonded thereto but the lubricating property inherent to graphite is maintained.

Example 2

A mixture of 10 g. of cobalt trifluoride and 1 g. of coke of 100 to 200 meshes was put into a nickel plated reactor and heated while maintaining the temperature at 300° C. for 1 hour. The product thus obtained was cooled and plunged into water and stirred. The substance floating up to the surface was collected, dried and 1.2 g. of a powder was obtained. The surface layer of this powder had chemical structure of $(CF)_n$, yet inner structure was essentially pure carbon. This powder was black brown, yet it showed similar properties in chemical resistance, hydrophobic and oil repellent properties similar to those of carbon fluoride obtained in the process of Example 1.

Example 3

1 g. of graphite powder of 200 to 300 meshes was put into a nickel plated container and while maintaining the temperature at 400° C., a mixture of 1 part (by volume) of chlorine trifluoride gas and 1 part (by volume) of nitrogen gas was delivered into the container at a rate of 300 cc./min. for 30 minutes. The graphite powders thus produced having fluorinated surface were incorporated into an asbestos thread which was used for a packing material for rotating 13 chromium stainless steel rod. The corrosion of the rod was tested and it was ascertained that no corrosion occurred after three days. No change occurred in the electric current for motor used for revolving the rod.

On the other hand, when the same test was made by using graphite powders without being treated with fluorine, the surface of the 13 chromium stainless steel rod was corroded at several places forming pores of 1 to 3 mm.

Example 4

A carbon electrode for air cell was put into a nickel plated container and while maintaining the temperature at 100° C., a mixture of 1 part (by volume) of fluorine gas and 9 parts (by volume) of nitrogen gas was delivered into the container at a rate of 300 cc./min. for 4 hours. The carbon electrode thus treated with fluorine was dipped into a 20% aqueous solution of caustic soda at 30° C., and it was ascertained that the increase in the weight after 24 hours was 5%. From when the electrode was dipped continuously for 15 days thereafter there was entirely no change in the increase of its weight. On the other hand, when a carbon electrode for air wet cell not treated with fluorine was dipped into an aqueous solution of caustic soda, it was found that the increase in weight after 24 hours was 33% and after 15 days it was 35%. A carbon electrode for air wet cell treated with benzene solution of 1% paraffin was dipped into an aqueous solution of caustic soda same as above and it was ascertained that the increase in weight after 24 hours was 31% and after 15 days it was 33%.

It will be apparent from the above that the carbon electrode for air wet cell treated with fluorine gas has the best water repellant properties.

Example 5

A graphite electrode for salt water electrolysis was put into a nickel plated container and while maintaining the temperature at 350° C. a mixture of 3 parts (by volume) of fluorine gas and 100 parts (by volume) of nitrogen gas was introduced into the container at a rate of 300 cc./min. for 2 hours so the fluorine reaches the inner pores. Then the lower part only of the electrode thus obtained was ground by means of sand paper, then the electrode was mounted in an electrolytic cell for sodium electrolysis by mercury process. A saturated salt solution was electrolyzed at a temperature of 70° C. with anode current density of 30 A./dm.$^2$. The consumption of the anode was 2 kg./ton of caustic soda. On the other hand, under the above described condition of electrolysis for the sodium electrolytic cell by mercury process the consumption of common graphite electrode not treated with fluorine gas was 4 kg. The above result is due to the fact that the invasion of electrolyte containing hypochlorous acid and chlorine into pores of the graphite electrode was prevented by the fluorine treatment so that the consumption due to oxidation and the consequent disintegration was prevented.

Example 6

A carbon brush for a motor was put into a nickel plated container together with 20 g. of cobalt tri-fluoride and while slowly introducing nitrogen gas it was heated to 350° C. for 1 hour. The carbon brush thus coated with carbon fluoride on its surface was subjected to the following short time corrosion tests. The carbon brush treated with fluorine was mounted to a motor, and while 1% salt water was being dropped on the rubbing surface, the motor was operated. It was ascertained that after 5 days no corrosion appeared on the rubbing surface. On the other hand, a carbon brush not treated with fluorine showed corrosion after 1 day by the above short time test and it became more severe after 2 days.

The examples showed that if the carbon or graphite powders or shaped articles thereof are subjected to fluorine treatment to form coating of fluorine compound on the outer surface and the surface of inner pores, the powders or articles have almost the same lubricating property as the untreated product and also almost the same conductivity as the untreated product since there is no change in most of the bonds within the carbon or graphite particles. However, the change in the molecular pattern on the surface develops excellently in water proof, oil proof, chemical resistance and anti-corrosion properties.

What we claim is:

1. A method for coating a shaped carbon article with a polycarbon fluoride containing carbon and fluorine atoms in an essentially 1:1 ratio which comprises the steps of introducing the shaped carbon article into a nickel plated container, reacting the carbon on the surface of said article with a fluorine source at a temperature of about 100–550° C. for about 30 minutes to about 4 hours to form on said carbon article a surface layer of said polycarbon fluoride in which carbon atoms are bonded to fluorine atoms by covalent bonds, said surface layer providing said article with chemical resistance, water repellent, oil-repellent, lubricating, and heat resistance properties.

References Cited

UNITED STATES PATENTS

| | | | |
|---|---|---|---|
| 2,786,874 | 3/1957 | Teeters et al. | 260—253 |
| 2,941,012 | 6/1960 | Forskey | 260—253.3 |

WILLIAM L. JARVIS, *Primary Examiner.*